United States Patent [19]

Goldberg

[11] Patent Number: 6,122,612
[45] Date of Patent: Sep. 19, 2000

[54] CHECK-SUM BASED METHOD AND APPARATUS FOR PERFORMING SPEECH RECOGNITION

[75] Inventor: Randy G. Goldberg, Princeton, N.J.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/975,589

[22] Filed: Nov. 20, 1997

[51] Int. Cl.[7] .................................................. G10L 15/22
[52] U.S. Cl. .......................... 704/231; 704/236; 704/243; 704/244; 704/245
[58] Field of Search .................................... 704/231, 255, 704/256, 275, 272, 236, 243, 244, 245

[56] References Cited

U.S. PATENT DOCUMENTS

| | | | |
|---|---|---|---|
| 3,466,394 | 9/1969 | French | 704/272 |
| 3,752,904 | 8/1973 | Waterbury | 248/13 |
| 3,896,266 | 7/1975 | Waterbury | 235/380 |
| 4,718,102 | 1/1988 | Crane et al. | 382/13 |
| 4,783,804 | 11/1988 | Juang et al. | 704/245 |
| 4,819,271 | 4/1989 | Bahl et al. | 704/256 |
| 4,908,865 | 3/1990 | Doddington et al. | 704/272 |
| 5,023,912 | 6/1991 | Segawa | 381/43 |
| 5,027,406 | 6/1991 | Roberts et al. | 381/43 |
| 5,125,022 | 6/1992 | Hunt et al. | 379/88 |
| 5,127,043 | 6/1992 | Hunt et al. | 379/88 |
| 5,216,720 | 6/1993 | Naik et al. | 704/272 |
| 5,255,310 | 10/1993 | Kim et al. | 379/88 |
| 5,274,560 | 12/1993 | LaRue | 364/444 |
| 5,283,833 | 2/1994 | Church et al. | 381/41 |
| 5,297,194 | 3/1994 | Hunt et al. | 379/88 |
| 5,303,299 | 4/1994 | Hunt et al. | 379/88 |
| 5,365,574 | 11/1994 | Hunt et al. | 379/88 |
| 5,384,833 | 1/1995 | Cameron | 704/275 |
| 5,452,397 | 9/1995 | Ittycheriah et al. | 395/2.49 |
| 5,454,062 | 9/1995 | LaRue | 395/2.63 |
| 5,455,889 | 10/1995 | Bahl et al. | 704/236 |
| 5,497,319 | 3/1996 | Chong et al. | 364/419.02 |
| 5,499,288 | 3/1996 | Hunt et al. | 379/88 |
| 5,502,774 | 3/1996 | Bellegarda et al. | 382/159 |
| 5,504,805 | 4/1996 | Lee | 379/67 |
| 5,509,104 | 4/1996 | Lee et al. | 395/2.65 |
| 5,517,558 | 5/1996 | Schalk | 379/88 |
| 5,519,786 | 5/1996 | Courtney et al. | 382/159 |
| 5,526,465 | 6/1996 | Carey et al. | 704/250 |
| 5,535,120 | 7/1996 | Chong et al. | 364/419.03 |
| 5,566,272 | 10/1996 | Brems et al. | 704/231 |
| 5,623,578 | 4/1997 | Mikkilineni | 704/255 |
| 5,623,609 | 4/1997 | Kaye et al. | 704/1 |
| 5,640,490 | 6/1997 | Hansen et al. | 704/254 |
| 5,675,647 | 10/1997 | Garneau et al. | 380/20 |
| 5,675,704 | 10/1997 | Juang et al. | 704/246 |
| 5,675,706 | 10/1997 | Lee et al. | 704/256 |
| 5,677,989 | 10/1997 | Rabin et al. | 704/246 |
| 5,680,509 | 10/1997 | Gopalakrishnan et al. | 704/270 |
| 5,687,287 | 11/1997 | Gandhi et al. | 704/247 |
| 5,745,555 | 4/1998 | Mark | 379/93.03 |
| 5,754,695 | 5/1998 | Kuo et al. | 382/228 |
| 5,832,063 | 11/1998 | Vysotsky et al. | 379/88 |
| 5,913,196 | 6/1999 | Talmor et al. | 704/270 |
| 5,937,385 | 8/1999 | Zadrozny et al. | 704/257 |

OTHER PUBLICATIONS

L.G. Kersta; "Voiceprint Identification"; Bell Telephone Laboratories, Inc., Murray Hill, NJ; Nature; Dec. 29, 1962; pp. 1253–1257.

Joseph P. Campbell, Jr.; "Speaker Recognition: A Tutorial"; Proceedings of the IEEE, vol. 85, No. 9, Sep. 1997; pp. 1437–1462.

*Primary Examiner*—David R. Hudspeth
*Assistant Examiner*—Susan Wieland

[57] ABSTRACT

A method and apparatus for matching at least a first input identifier with a reference identifier. A user provides an input identifier into a system, and the system produces a recognized identifier based on the input identifier. The system of the present invention perform a check-sum operation to determine whether the recognized identifier was recognized correctly. If the check-sum operation reveals that the recognized identifier is incorrect, the system of the present invention generates a plurality of substitute identifiers. The substitute identifiers are compared to a set of pre-stored reference identifiers. If a match is found between a reference identifier and a substitute identifier, the matched reference identifier is selected as corresponding to the input identifier provided by the user.

50 Claims, 5 Drawing Sheets

CHECK-SUM BASED METHOD AND APPARATUS FOR PERFORMING SPEECH RECOGNITION

CROSS-REFERENCE TO RELATED APPLICATIONS

The present application is related to the following commonly assigned U.S. patent applications: Ser. No. 08/763,382, filed Dec. 13, 1996, entitled "Statistical Database Correction Of Alphanumeric Account Numbers For Speech Recognition And Touch-Tone Recognition;" Ser. No. 08/771,356, filed Dec. 16, 1996, entitled "Constrained Alpha-Numerics For Accurate Account Number Recognition;" Ser. No. 08/909199, filed Aug. 11, 1997, entitled "A Confusion Matrix Based Method And System For Correcting Misrecognized Words Appearing In Documents Generated By An Optical Character Recognition Technique;" Ser. No. 08/909200, filed Aug. 11, 1997, entitled "Method And Apparatus For Performing An Automatic Correction Of Misrecognized Words Produced By An Optical Character Recognition Technique By Using A Hidden Markov Model Based Algorithm;" Ser. No. 08/953579, filed Oct. 17, 1997, entitled "Method And Apparatus For Accessing Pre-Defined Grammars;" Ser. No. 08/953469, filed Oct. 17, 1997, entitled "Method And Apparatus For Minimizing Grammar Complexity;" Ser. No. 08/953468, filed Oct. 17, 1997, entitled "Method And Apparatus For Performing A Grammar-Pruning Operation;" and Ser. No. 08/975587, entitled "Method And Apparatus For Performing A Name Acquisition Based On Speech Recognition," and Ser. No. 08/975588, entitled "Confusion Set-Based Method And Apparatus For Pruning A Predetermined arrangement Of Indexed Identifiers," filed concurrently herewith.

BACKGROUND INFORMATION

The present invention is directed to a method and apparatus that matches an input identifier to a reference identifier, and, in particular, to a method and apparatus that uses identifiers that incorporate at least one check-sum digit in order to correct any misrecognized input identifiers by generating a set of possible substitute identifiers. The misrecognized identifier is replaced by a substitute identifier that matches a valid reference identifier.

Most institutions, such as banks, department stores, and airlines, provide customers with telephone access to a wide variety of services and information. Before the advent of touch-tone telephones, a customer would obtain these services and information through interacting with a live operator. As touch-tone telephones became more prevalent in homes, these institutions began switching to automated customer-access systems. After dialing a telephone number, a customer using such systems would be asked to enter an account number, or some other identifier. As used herein, the term "identifier" refers to a string of characters that may comprise a plurality of letters, numbers, or words; based on this definition, an identifier may comprise either a random aggregation of characters, an actual word, or the name of a place or a person. Furthermore, as used herein, an identifier may comprise, but is not limited to, a string of characters for identifying a particular product, service, or location.

Today, a user can provide such an identifier to an institution through a number of ways besides touch-tone telephony, including by speaking the identifier into the telephone handset. When the user is prompted to speak the identifier, the institution uses a speech recognition system to produce a recognized identifier based on the spoken identifier. Regardless of how the user enters the identifier, however, once a recognized signal representative of the input identifier has been received at the institution, the institution must match the recognized signal with one of a plurality of pre-stored identifiers, which are also referred to as reference identifiers. After a match between the input identifier and a reference identifier is found, the institution performs a transaction based on the matched reference identifier, such as retrieving account information or ordering a specific product. Finding such a match may take some time, however, since institutions often maintain thousands, if not millions, of reference identifiers. Moreover, the more reference identifiers that an institution must search through in order to find a match with an input identifier, the less accurate this search becomes. Matching input identifiers with the wrong reference identifiers at least leads to delays and customer dissatisfaction, and perhaps also to erroneous billing or even to divulging sensitive, confidential information. This problem is exacerbated if the system misrecognizes the input identifier, since the system will attempt in this situation to find a reference identifier that matches a recognized identifier that does not correspond exactly with the input identifier provided by the user. In the event, however unlikely, that the system finds a reference identifier that matches the misrecognized identifier, whatever subsequent transactions are performed by the user will be based on erroneous information, since the system will be acting on the basis of a reference identifier that was matched to a recognized identifier that does not correspond to the input identifier. For instance, if a user provides an identifier that corresponds to a television he wishes to purchase, and the system misrecognizes the input identifier as another identifier, one that, for instance, corresponds to a radio, the merchandise purchase system will ship an unwanted item to the user. Quite obviously, this possibility would result in frustration to consumers and lost sales and reduced efficiency for businesses that rely on telephone-based consumer interaction systems. What is therefore needed is a system that detects when an input identifier has been misrecognized and that corrects such misrecognized identifiers so that the user-provided input identifier is accurately matched to the appropriate reference identifier.

SUMMARY OF THE INVENTION

The present invention is directed to a method and apparatus that initially accepts from a user an input identifier and generates a recognized identifier that is intended to correspond exactly to the input identifier. Each identifier incorporates at least one check-sum digit or code, so that after the present invention produces a recognized identifier, it can determine, based on the performance of a check-sum operation, whether the input identifier was correctly identified. If the check-sum operation reveals that the input identifier was indeed correctly recognized, the present invention attempts to match the correctly recognized identifier with a reference identifier maintained in memory. If such a match is found, the present invention accepts the user. If, on the other hand, the check-sum operation reveals that the input identifier was incorrectly recognized, the present invention generates a plurality of possible substitutes for the misrecognized identifier. Once the substitute identifiers have been generated, the system determines if any of these substitute identifiers matches a reference identifier. If such a match is found, the present invention accepts the user on the basis of the matched substitute identifier.

According to another embodiment of the present invention, the present invention reduces the set of generated substitute identifiers before it is compared to the set of reference identifiers. In this embodiment, the present invention uses a confusion matrix to determine which of the generated substitute identifiers have a probability that is better than a predetermined threshold of matching the input identifier. A confusion matrix is a data structure that stores a plurality of recognition probabilities. Each recognition probability represents the probability that a particular character spoken by a user will be recognized by the present invention either as the same character or as another character. On the basis of these probabilities, the present invention eliminates from consideration those substitute identifiers having a low probability of matching the input identifier. Those substitute identifiers that remain are then compared with the stored reference identifiers in the same manner as in the previous embodiment.

DETAILED DESCRIPTION

Figure 1:
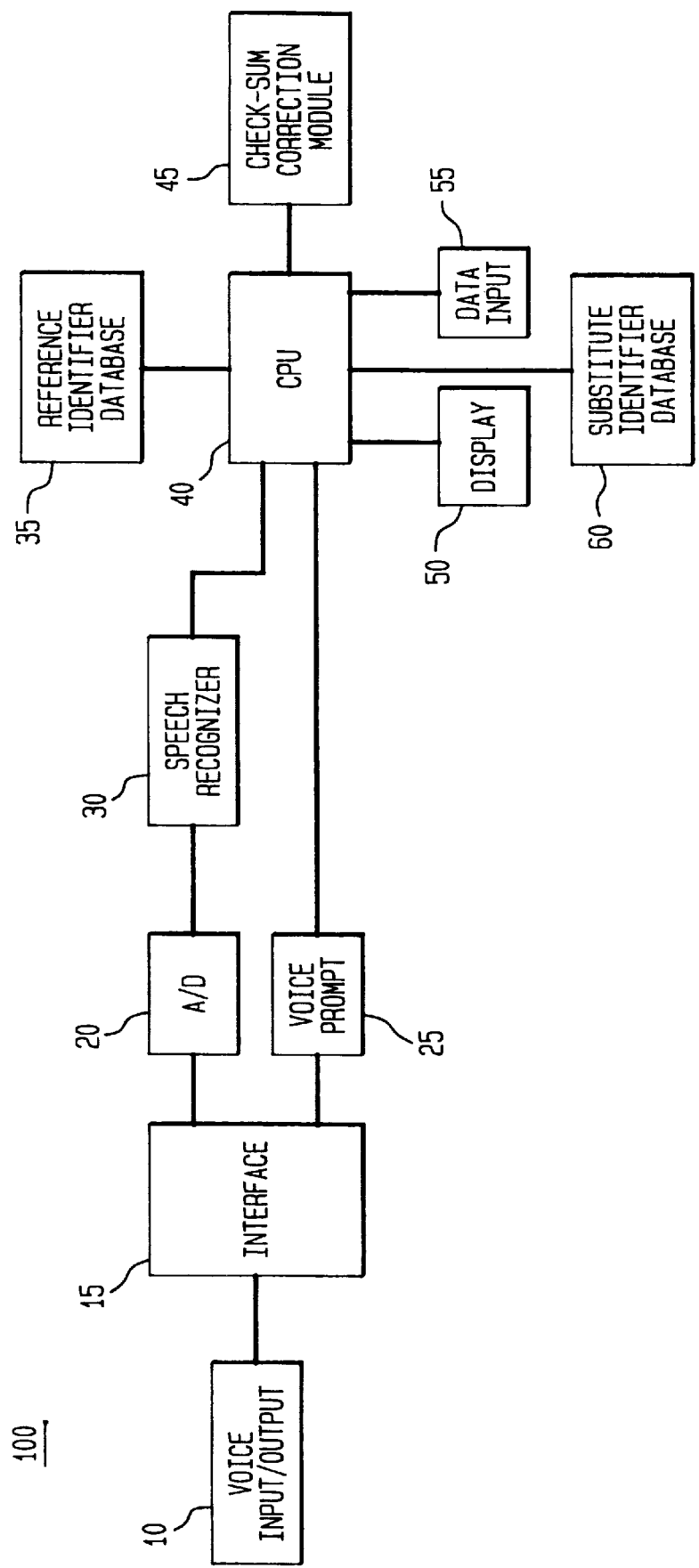
FIG. 1 illustrates a block diagram of a system in accordance with an embodiment of the present invention.

FIG. 1 illustrates a system that implements the check-sum correction routine of the present invention. The system of FIG. 1 is merely an example of one kind of system that is capable of supporting the present grammar accessing routine, and it should be appreciated that the present grammar accessing routine is compatible with numerous other applications.

The system 100 of FIG. 1 includes a voice input/output device 10, which may comprise a conventional telephone, or any other known device capable of converting an audible vocal signal to an electrical signal and vice versa. Connected to the voice input/output device 10 is an interface 15 that interfaces the voice input/output device 10 to the remaining components of system 100. The interface 15 may comprise a conventional public switched telephone network ("PSTN"). Of course, an interface is necessary only if the voice is to be transmitted to a remote location for processing; as an alternative, the components of system 100 may be provided in a unitary apparatus, save for the interface 15. The present invention is intended to encompass both types of systems. After the voice signal is converted to a digital signal by an analog-to-digital ("A/D") converter 20, the digitized voice signal is provided to a speech recognizer 30, which may comprise a HARK™ 3.0 recognizer, for example. After employing a speech recognition routine, which may, for example, be based on the Hidden Markov Model, speech recognizer 30 provides a recognized output that is intended to correspond to the information that the user spoke into the voice input/output device 10. This recognized output, which is in the form of a well-known digital code, is referred to as a recognized "identifier," and it is provided to an input of CPU 40. Coupled to CPU 40 are a reference identifier database 35, a check-sum correction module 45, and a substitute identifier database 60, along with a live operator station comprising display 50 and data input device 55. The system 100 also includes a voice prompt device 25, which provides, under the control of CPU 40, audible voice prompts that are intended to guide a user through the operation of system 100.

Reference identifier database 35 stores a set of reference identifiers, each of which may, for example, uniquely identify an account, person, merchandise item, etc.. Although the reference identifiers may comprise any arrangement of numbers, letters, or other characters, assume for purposes of illustration only that the reference identifiers in this example are entirely numeric and that they are each six digits long. Thus, a sample reference identifier would be 117526. Further assume that the last digit in each account number comprises a check-sum digit. As it is normally understood, a check-sum digit represents a value that is intended to correspond to the values of the other digits in the code according to a predetermined relationship. Check-sum digits are typically used in systems for security purposes or to ensure that signals transmitted over transmission mediums are protected against noise or other sources of signal degradation. When a digital code arrives at a particular destination, the receiving system at the destination performs a mathematical operation on the values embodied in the received digital code in order to determine whether the received check-sum digit and the remaining values of the received code conform to the predetermined relationship mentioned above. If these values do conform to the predetermined relationship, the receiving system treats the received code as having been correctly received. For example, with respect to the code 117526, the check-sum digit is the last one in the code, 6. Assume that the predetermined relationship to which this digit and the remaining digit values of the code must conform is that the sum of the non-check-sum digits, added according to modulo-10 addition, must equal the value of the check-sum digit. In this example, 1+1+7+5+2=16, or 6 in modulo-10 terms. Since the modulo-10 addition of the non-check-sum digits equals the check-sum digit, a system that receives this code over a transmission medium and performs this operation would treat this received code as correct.

Although the following discussion of system 100 assumes that reference identifiers, input identifiers, and substitute identifiers all follow the check-sum format discussed above, the present invention is not limited to this single check-sum embodiment, but instead encompasses any check-sum relationship and any digital code format, so long as the format is capable of serving as a unique identifier for distinguishing among different persons, accounts, merchandise, services, etc.. As an alternative, for example, to the above-discussed format, the identifiers processed by system 100 may comprise alphabetical letters. In this instance, the predetermined format would assign a numerical value for each letter; that is, the system 100 would interpret an A as a 10, a B as an 11, a C as a 12, and so on. When performing a check-sum operation, the system 100 may be programmed to perform a mathematical operation other than the modulo 10 addition discussed above; for example, in the alphabetical format, the system 100 may perform a modulo 36 addition to determine if a code embodied in such a format was correctly received.

Although the principles of the present invention are discussed herein within the context of a speech recognition system, it should be appreciated that the present invention may also rely on touch-tone telephone signaling to produce the recognized identifier. In this type of system, a user would enter the characters of the identifier by manipulating an appropriate set of keys on a telephone handset. Speech recognizer 30 would be replaced by any suitable device, commonly available in current touch-tone recognition systems, that would produce a recognized identifier based on the entered touch-tone signals.

Returning to the system 100 of FIG. 1, a user accesses system 100 through voice input/output device 10 by speaking a particular identifier of a first type into device 10. Using a recognized identifier that is based on the voice signal provided by the user, the system 100 then performs a check-sum operation on the recognized identifier to determine whether the input identifier provided by the user was correctly recognized. If the check-sum operation confirms that the recognized identifier was in fact correctly recognized, the system 100 compares the correctly recognized identifier to the reference identifiers maintained in reference identifier database 35. If the recognized identifier matches one of the reference identifier, the system selects the matched reference identifier as corresponding to the input identifier.

On the other hand, if the system 100 determines from the check-sum operation that the recognized identifier was not correctly received, it determines the difference between the check-sum value and the modulo-10 value of the summed digits. Based on this difference, the system 100 then attempts to produce an identifier that not only matches one of the reference identifiers, but that also satisfies the check-sum relationship. The system accomplishes this by generating a set of substitute identifiers based on the value of the recognized identifier. If, for instance, the check-sum digit and the modulo-10 sum differ by one, then each substitute identifier would differ from the recognized identifier by a value of one in one of the digit positions. The system 100 would then determine which of the substitute identifiers matches which of the reference identifier. The matched reference identifier would then be selected as corresponding to the input identifier.

Figure 2:
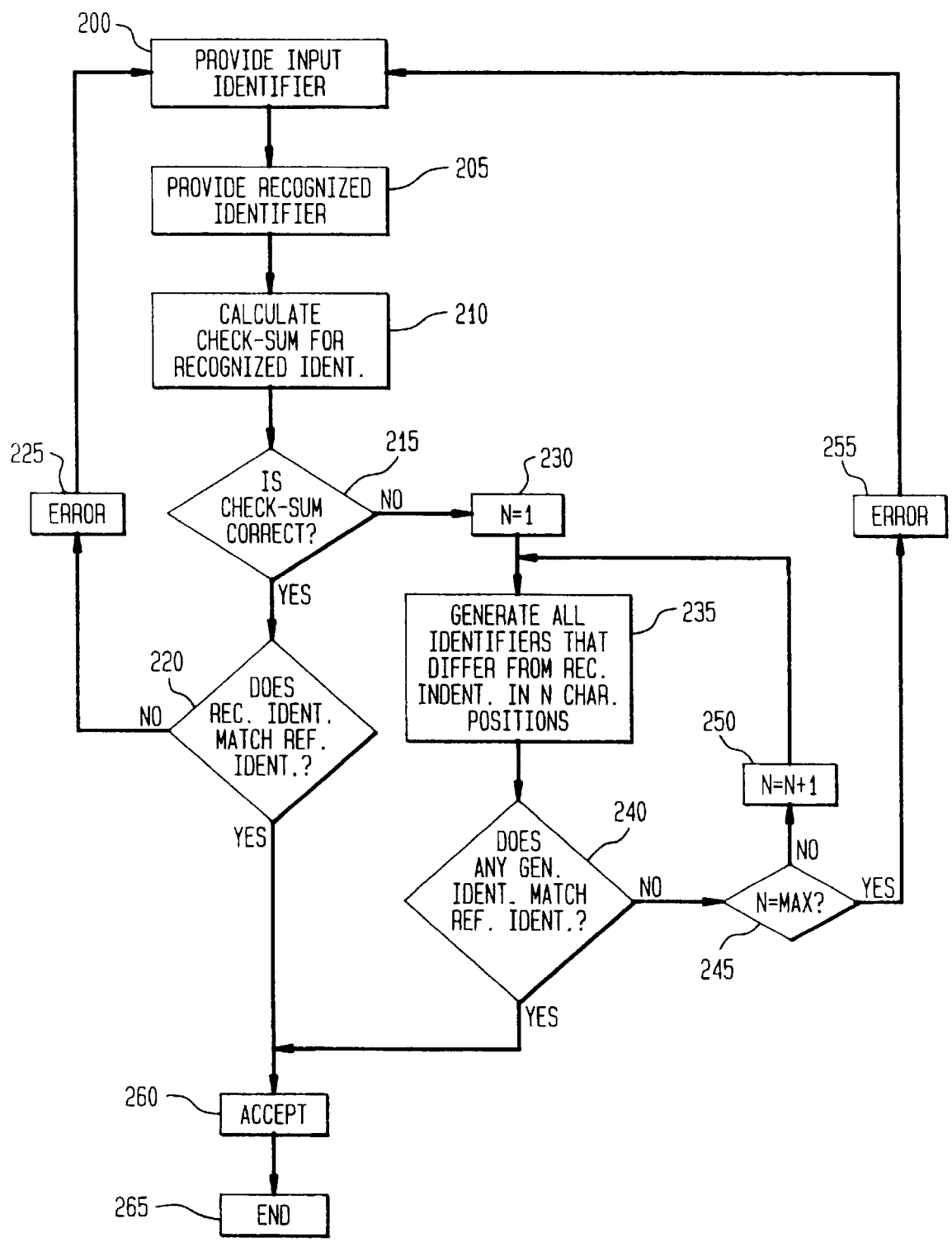
FIG. 2 illustrates a flow diagram explaining the operation of the system of FIG. 1.

For a more complete discussion of the operation of the system 100, reference is now made to the flow diagram of FIG. 2, which presents an algorithm, maintained in check-sum correction module 45, under which CPU 40 operates. The operation of the system 100 begins when a user is prompted to provide an input identifier (step 200). Assume that the user speaks the identifier 116536 into voice input/output device 10. This input identifier may correspond to an account number or some other information that must be provided in order for the user to perform a desired transaction with system 100. The last digit, 6, is a check-sum digit, and this identifier satisfies the above described modulo-10 relationship because the sum of the other digits in the input identifier yields a modulo-10 sum of 1+1+6+5+3=16 (6 in terms of modulo-10 notation). After the voice signal carrying the input identifier is digitized by A/D converter 20, the digitized voice signal is supplied to speech recognizer 30, which produces a recognized identifier intended to correspond to the input identifier (step 205). Assume, however, that in this example speech recognizer 30 misrecognizes the input identifier and produces the incorrect recognized identifier of 116526. The recognized identifier and the input identifier differ from each other at the fifth digit position: the recognized identifier includes a 2 at this position, and the input identifier includes a 3 at this same position.

After speech recognizer 30 produces the recognized identifier 116526, CPU 40 performs the above described modulo-10 addition to determine whether the sum of the first five digits yields the check-sum digit (step 210). Performing this operation on the recognized identifier 116526, CPU 40 determines that the recognized identifier is incorrect (step 215) because the modulo-10 sum of the first five digits of the recognized identifier equals 5, not 6. Had the recognized identifier been determined to be correct in step 215, CPU would have compared the recognized identifier with the contents of reference identifier database 35 to determine whether any reference identifier matches the recognized identifier (step 220). If no such match exists, CPU 40 would have issued an error message to the user through voice prompt device 25, after which the user would have been prompted to provide the input identifier again, or, alternatively, the user would have been transferred to a live operator who would assist the user access system 100.

Returning to the example of the incorrect recognized identifier, after determining that the recognized identifier is incorrect, CPU 40 is required to determine what the correct identifier should have been. Although CPU 40 is not provided with any information that would indicate which digit positions of the recognized identifier are in error, CPU 40 has determined in step 215 that the recognized identifier is off by a value of 1. Since CPU 40 cannot determine where this error is, CPU must generate a set of alternative identifiers from which one that matches the input identifier is selected. This set of alternative identifiers is referred to as a set of substitute identifiers, and all each substitute identifier includes a check-sum digit that is equal to the modulo-10 sum of its non-check-sum digits. In this example, the set of substitute identifiers covers those identifiers for which the modulo-10 addition of the non-check-sum digits differs by a value of 1 from the modulo-10 sum of the non-check-sum digits of the recognized identifier. This set also covers a substitute identifier having a check-sum digit that differs from the check-sum digit of the recognized identifier by an amount equal to the difference between the check-sum digit of the recognized identifier and the modulo-10 sum of the non-check-sum digits of the recognized identifier. In order to do initiate the generation of the substitute identifiers, CPU 40 first initializes count variable N to 1 (step 230). A variable MAX has also been set to a predetermined value before putting system 100 into practice. This value determines the maximum number of digit positions for which a substitute identifier may differ in value from the recognized identifier. Thus, if MAX is set to 2, the most digit positions for which any generated substitute identifier can have values that are different from those in the corresponding digit positions of the recognized identifier is 2. Thus, if 116516 is the recognized identifier, 126616 would be an acceptable substitute identifier if MAX=2 because these identifiers differ in value only at the second and fourth digit positions. In contrast, CPU 40 would not provide 141826 as a substitute identifier in this instance because these identifiers differ in value in four digit positions. In practice, MAX is usually set no higher than 2.

Returning to the above-mentioned example, when N is initially set to 1 (step 230), CPU 40 generates substitute identifiers that differ in value from the recognized identifier in only one digit position. If none of these substitute identifiers matches any reference identifier from database 35 and N is determined to not equal MAX (step 245), N is incremented by 1, in this case to 2 (step 250), and a new set of substitute identifiers is generated (step 235), this new set comprising only substitute identifiers that differ in value from the recognized identifier in two digit positions. This substitute identifier generation can be carried out by using any suitable code generating algorithm. In this example, when N=1, the substitute identifiers would appear as follows:

116525
116536

116626
117526
126526
216526

Each of the substitute identifiers satisfies the modulo-10 check-sum relationship. The underlined digit in each substitute identifier is the digit that differs from the corresponding digit value of the recognized identifier by a value of 1. In the first substitute identifier, 116525, the value of the check-sum digit, 5, differs from the value of the check-sum digit of the recognized identifier by one. The value of the check-sum digit of the recognized identifier, 6, has been reduced in this substitute identifier to 5 because the modulo-10 sum of the other digits is 5. In changing the value of each of the other bit positions of the recognized identifier, CPU 40 adds a value of 1 because the value of the modulo-10 sum of the first five digits of the recognized identifier was determined to be less than the check-sum digit of six by a value of 1. Therefore, in each of the subsequent substitute identifiers in the list presented above, the digit that is changed from the value of the corresponding digit of the recognized identifier is increased by one. Thus, in the second substitute identifier of the list, the next-to-last digit is changed to three because the corresponding digit in the recognized identifier is a 2; in the third substitute identifier, the fourth digit is changed from a 5 to a 6. This process is repeated for every digit position of the recognized identifier; what results is a set of substitute identifiers, each one differing from the recognized identifier in one bit position by a value equal to the difference between the check-sum digit of the recognized identifier and the modulo-10 sum of the other digits of the recognized identifier.

After a set of substitute identifiers is generated in step 235, CPU 40 supplies these substitute identifiers to substitute identifier database 60 and determines whether any of the substitute identifiers matches a reference identifier from database 35. If no match is found, CPU 40 checks if N=MAX (step 245). If N does not yet equal MAX, CPU 40 increments N by 1 and generates a new set of substitute identifiers and repeats the comparison with database 35 in the manner discussed above. If N=MAX and no match exists between the current set of substitute identifiers and the reference identifiers of database 35, then CPU 40 causes voice prompt device 25 to issue an error message (step 255) and either require the user to enter the input identifier again or connect the user to a live operator for assistance. Of course, the present invention is not limited to performing a database comparison every time a new set of substitute identifiers is generated for a newly incremented value of N; instead, the present invention may generate every possible substitute identifier for N=1, 2, . . . MAX at one time, and then perform the comparison with database 35. Returning to FIG. 2, if a match is found between a substitute identifier and a reference identifier, then the user is accepted (step 260) and a transaction based on the matched reference identifier may proceed. Alternatively, before the system 100 executes a transaction based on the matched reference identifier, the user may be prompted with the matched reference identifier to confirm that the matched reference identifier does indeed match the input identifier. The user may provide this confirmation either vocally through voice input/output device 10 or through manipulating an appropriate set of keys on a keypad of device 10. Moreover, if more than one substitute identifier matches a corresponding reference identifier, then the user is prompted with each matched reference identifier until the user confirms that a particular matched reference identifier corresponds to the input identifier. System 100 may then allow the user to perform a particular transaction.

Figure 3:
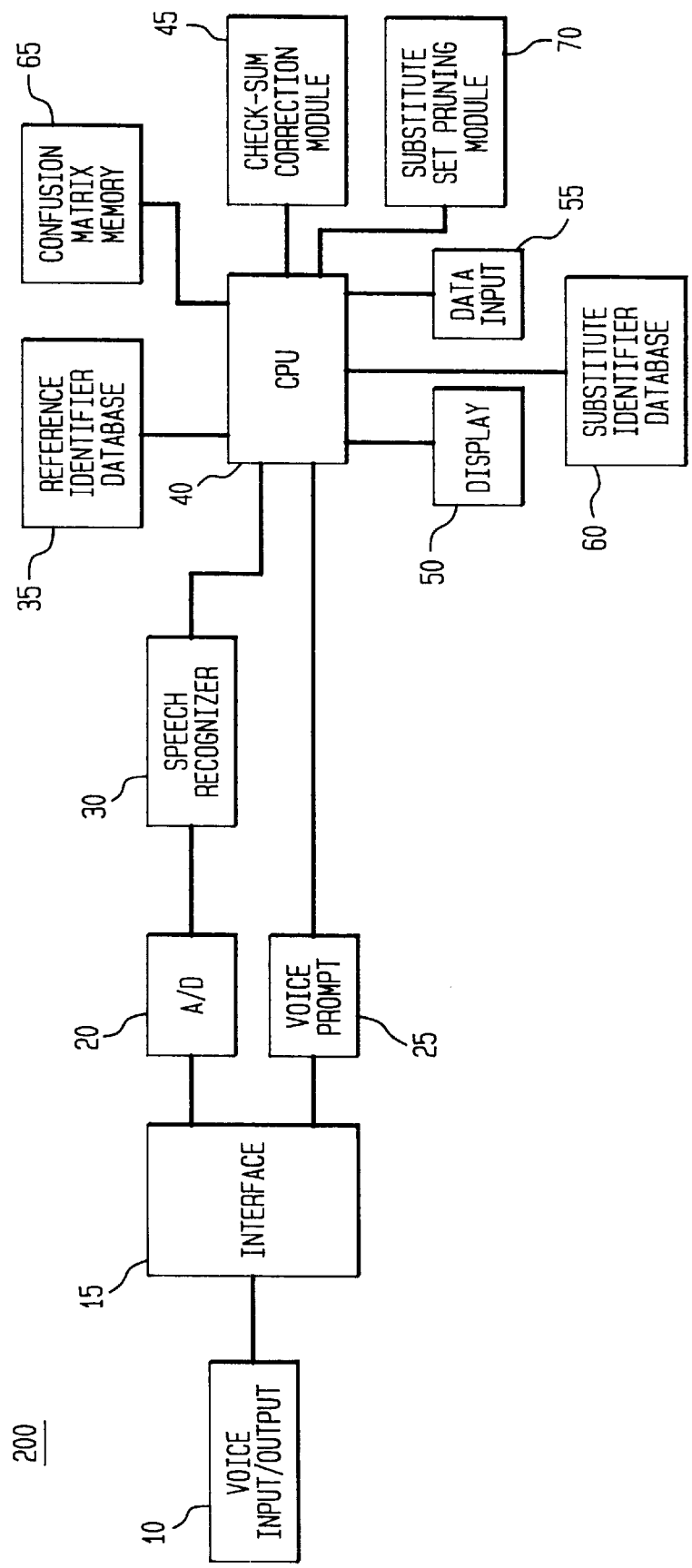
FIG. 3 illustrates a block diagram according to another embodiment of the present invention.

FIG. 3 illustrates a second embodiment of the present invention. The system 200 of FIG. 3 contains all of the components of system 100, plus a confusion matrix memory 65 and a substitute set pruning module 70, the operation of which shall be explained shortly hereafter. As explained before, the substitute identifiers are generated when the recognized identifier has been determined to be incorrect, meaning that it does not match the input identifier exactly. The steps of generating the substitute identifiers and comparing them to the reference identifier database 35 are a search for what the recognized identifier should have been had the recognition step been performed correctly. The confusion matrix memory 65 and substitute set pruning module 70 enhance the efficiency of this search by eliminating from the comparison with database 35 those substitute identifiers having a small chance of corresponding to what the correct recognized identifier should look like.

Figure 4:
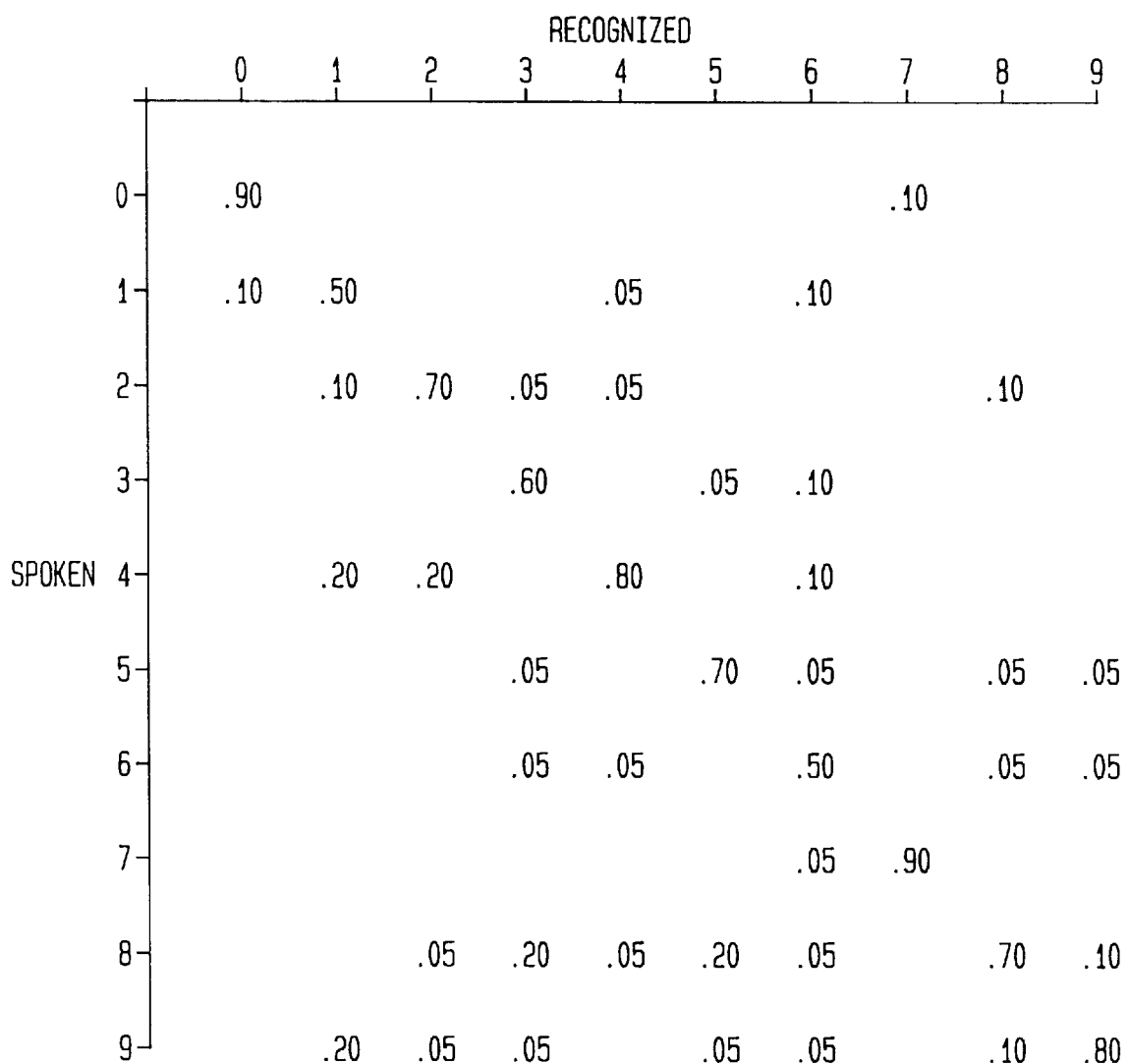
FIG. 4 illustrates an exemplary confusion matrix used by the system of FIG. 2.

Before discussing the operation of the system 200, reference should be made to FIG. 4, which illustrates a confusion matrix maintained in memory 65. In the example of FIG. 4, each recognition probability is provided in the form of a decimal value. Each recognition probability represents the probability that a particular character spoken by a user into voice input/output device 10 will be recognized by recognizer 30 either as the same character or as another character. For example, the confusion matrix is intended to provide a probability that, when "1" is spoken into device 10, the recognizer 30 will yield a "1", or a "2", a "3", etc., for that particular spoken number. The particular confusion matrix in FIG. 4 covers numbers only, since the examples that have been discussed so far focus on numerical identifiers, but a confusion matrix can cover not only numbers, but letters and other characters as well. Moreover, in the example of FIG. 4, where no entry is provided, the blank entry should be read as a zero. In practice, however, the entire matrix may be populated with recognition probabilities.

The confusion matrix of FIG. 4 is read as follows: the vertical columns correspond to characters that are produced by recognizer 30. The horizontal rows correspond to characters that are spoken by a user into voice input/output device 10. Of course, the confusion matrix of FIG. 2 may be configured in reverse, in which the horizontal rows correspond to characters produced by recognizer 30, and in which the vertical columns correspond to characters that are spoken by the user. The values that are provided in the confusion matrix represent different probabilities. For example, based on the confusion matrix of FIG. 4, given that the number "1" is produced by recognizer 30, the probability that "1" was spoken by the user is 50%. The column for the letter "1" also reveals that, given that a "1" was recognized by recognizer 30, there is a probability of 5% that the user spoke a "2", a probability of 5% that the user spoke a "3", a probability of 20% that the user spoke a "4", and a probability of 20% that the user spoke a "9".

The particular probabilities that are provided in FIG. 4 are determined in advance through experimentation, and they are tailored to suit the particular recognizer 30. Thus, before a particular recognizer is to be used in the system of FIG. 1, a confusion matrix corresponding to that particular recognizer must first be populated. Thus, when a particular recognizer is to be used in the system of FIG. 1, a test group of persons repetitively provides pronunciations of each of the letters and numerals to be included in the confusion matrix, and the recognized output of recognizer 30 for each pronunciation is recorded. In order that the results of these tests incorporate the influence of the noise and bandwidth limitations that affect speech recognizers operating under real conditions, the vocal pronunciations of this test group of persons may be provided to the speech recognizer 30 over a telephone line. From these various "trial runs" of speech recognizer 30, the probabilities that characterize the recognition accuracy of the speech recognizer 30 are established, and these probabilities can be entered as a confusion matrix into memory 65 through data input device 50. Since different recognizers exhibit different recognition accuracies, if speech recognizer 30 is to be replaced with a different recognizer, a confusion matrix corresponding to the replacement recognizer may be entered into memory 65. Or, alternatively, memory 65 may store in advance a plurality of predetermined confusion matrices corresponding to different recognizers, so that when a replacement recognizer is implemented, the corresponding confusion matrix may be accessed by entering a command through input device 50. It should be noted that the probabilities of a confusion matrix need not be arranged in matrix form, but may be arranged as an array, or as any other data structure capable of associating a recognized and spoken character in terms of a probability.

Figure 5:
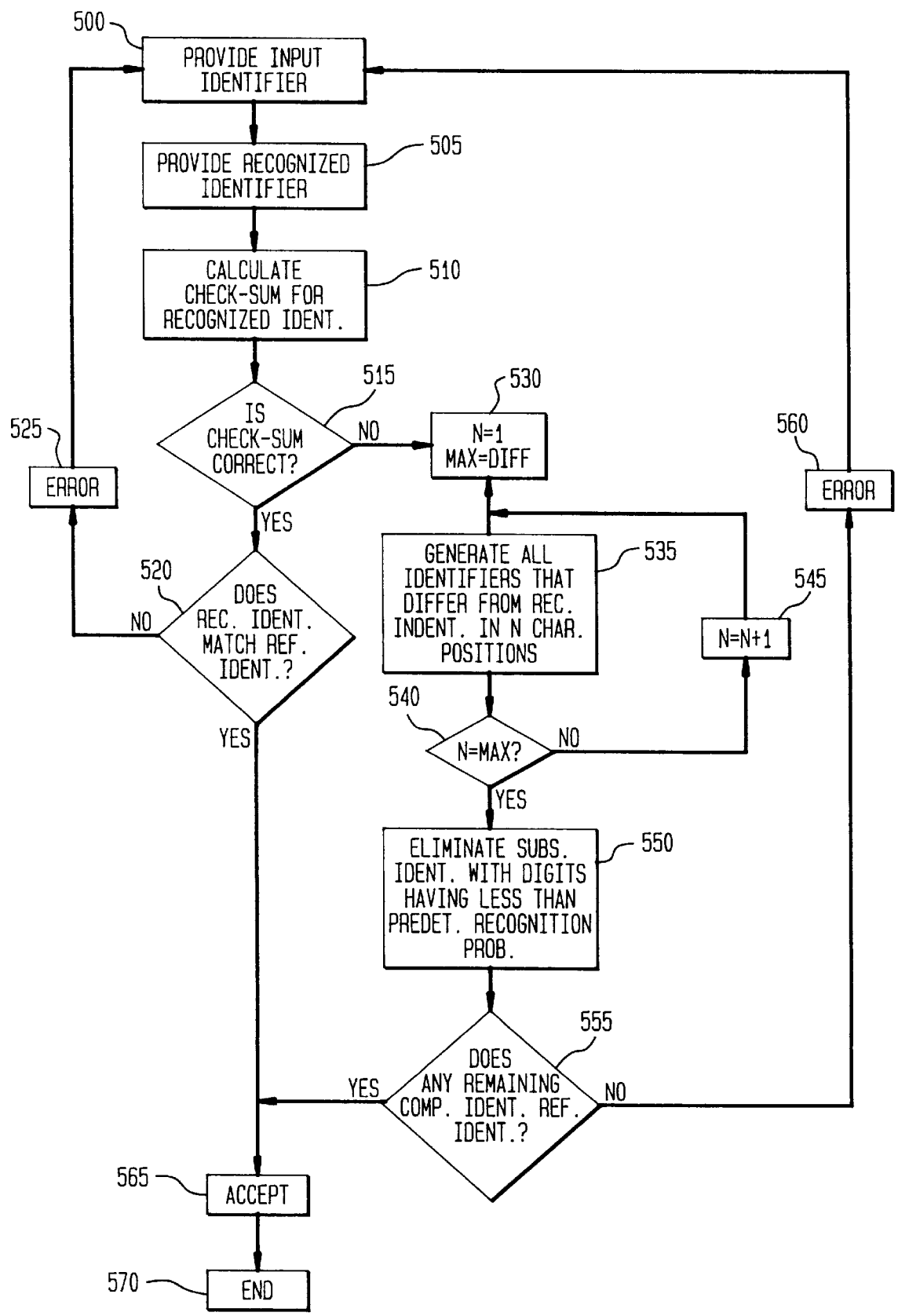
FIG. 5 illustrates a flow diagram explaining the operation of the system of FIG. 3.

For a more complete discussion of the operation of the system 200, reference is now made to the flow diagram of FIG. 5, which presents an algorithm, part of which is maintained in check-sum correction module 45 and part of which is maintained in substitute identifier pruning module 70, under which CPU 40 operates. The operation begins when voice prompt device 25 prompts the user to speak an input identifier into voice input/output device 10 (step 500). Speech recognizer 30 produces a recognized identifier in the same manner as discussed above (step 505). CPU 40 performs a check-sum operation (step 510) and determines whether the check-sum yielded by the recognized identifier is correct. (step 515). If the determined check-sum is incorrect, CPU 40 generates a plurality of substitute identifiers in the same manner as discussed above (steps 530–545). Once a set of substitute identifiers has been generated and supplied to substitute identifier database 60, CPU 40 consults the confusion matrix in memory 65 in order to determine which substitute identifiers should be eliminated from consideration (step 550). For example, assume that four of the substitute identifiers are the following:

126616
116806
113836
141826

Also assume that the recognized identifier is 116516. CPU 40 would compare each digit of each substitute identifier with each corresponding digit of the recognized identifier and determine from the confusion matrix the probability that, given a particular digit of the recognized identifier, the digit value of the corresponding digit position of a substitute identifier was spoken by the user. CPU 40 eliminates those substitute identifiers that include numbers for which a recognition probability that is less than a predetermined threshold was determined from the confusion matrix. Assume that the predetermined threshold percentage is 7%, which may be selected on an empirical basis given the known recognition accuracy of the speech recognizer 30 and the desired overall accuracy for system 200. Referring to the first substitute identifier of the list presented above, namely, 126616, CPU 40 determines that the first digit of this substitute identifier is 1 and the first digit of the recognized identifier is 1 also. From the confusion matrix of FIG. 4, CPU 40 determines that the probability of "1" having been spoken, given that "1" was recognized, is 50%. This percentage is over 7% and therefore cannot serve as a basis for eliminating substitute identifier 126616. At the second digit position, CPU 40 determines that the probability that "2" was spoken (from the second digit position of the substitute identifier), given that "1" (from the second digit position of the recognized identifier) was recognized, is 10%. Therefore, this percentage also cannot serve as a basis for eliminating the substitute identifier 126616. Similarly, at the third digit position, the probability that a "6" was spoken, given that a "6" was recognized, is 50%. Nevertheless, at the fourth digit position, the probability that "6" was spoken, given that "5" was recognized, is 0%; therefore, on this basis, substitute identifier 126616 is eliminated. Although other pairs of digit values from the substitute identifier and the recognized identifier may also fall below the predetermined threshold, CPU 40 stops analyzing such pairs for any given substitute identifier once a single such pair is determined to fall below the predetermined threshold. After a single such instance is discovered by CPU 40, CPU 40 eliminates the associated substitute identifier and moves on to the next one. Thus, in this example, the only instance when CPU 40 analyzes each pair of digit values for each digit position of a given substitute identifier and recognized identifier is when each pair of digit values is associated with a recognition probability that is higher than the predetermined threshold.

With respect to the other substitute identifiers presented above, substitute identifier 116806 is eliminated from consideration because at the fifth digit position, the probability that "0" was spoken, given that "1" was recognized, is 0%; substitute identifier 113836 is also eliminated from consideration because at the fifth digit position, the probability that a "3" is spoken, given that a "1" was recognized, is 0%. On the other hand, substitute identifier 141526 is accepted for comparison with reference identifier database 35 because the pairs of digit values associated with the recognized identifier all correspond to recognition probabilities that are higher than the predetermined threshold of 7%.

As an alternative way to determine which substitute identifiers should be eliminated from consideration, CPU 40 may be programmed to determine for each entire substitute identifier a recognition probability based on selected values from the confusion matrix. For example, for the recognized identifier 116516 and the substitute identifier 116806, CPU 40 would determine for each character position, given that a particular character of the recognized identifier was recognized, the probability that the character in the corresponding character position of the substitute identifier was actually spoken by the user. These probabilities would be obtained from the confusion matrix in the same manner as discussed above. For this example, the obtained probabilities would be (0.5)(0.5)(0.5)(0.2)(0)(0.5), and their product would be 0%. In this method, the threshold to which such calculated recognition probabilities would be compared would need to much lower than the 7% used above, since multiplying decimals always yield much smaller numbers. Of course, the present invention is not limited to multiplying such probabilities in order to determine recognition probabilities; the present invention encompasses the performance of any other suitable technique or operation on such probability values in order to provide system 100 with a basis for eliminating those substitute identifiers with a remote chance of matching the input identifier.

Returning to FIG. 5, after CPU 40 determines in step 550 which substitute identifiers are to be eliminated form consideration, CPU 40 compares each remaining substitute identifier with the reference identifiers in database 35 (step 555). If at least one match is found, the user is accepted (step 565). At this point, the user may be prompted with the matched reference identifier to confirm that the matched reference identifier does indeed match the input identifier. The user may provide this confirmation either vocally through voice input/output device 10 or through manipulating an appropriate set of keys on a keypad of device 10. If more than one substitute identifier matches a corresponding reference identifier, then the user is prompted with each matched reference identifier until the user confirms that a particular matched reference identifier corresponds to the input identifier. System 200 may then allow the user to perform a particular transaction.

Although the present invention has been presented within the context of a speech recognition system that matches an input identifier with one of a plurality of prestored reference identifiers, it should be appreciated that the present invention is not limited thereto, but instead, is applicable to any application requiring the correction of an initially misrecognized input identifier in order to allow a user to perform a desired transaction with a data processing system. Besides allowing the present invention to determine whether an input identifier has been misrecognized, the use of the check-sum digits in the manner discussed above allows the present invention to correct any such misrecognized identifiers by generating a set of possible substitutes for the misrecognized identifier. By doing so, the present invention improves over the accuracy of previously proposed identification systems. Furthermore, although the self-correcting character of the above-described embodiments is brought about by the use of identifiers that incorporate check-sum digits, the present invention is compatible with any coding scheme or other data manipulation operation that detects and corrects misrecognized input character strings.

What is claimed is:

1. A method of recognizing at least one input identifier, comprising:
   a) providing a recognized identifier based on the input identifier;
   b) determining whether the recognized identifier was recognized correctly by determining whether an information content of the recognized identifier corresponds to an information content of the input identifier;
   c) generating a set of substitute identifiers only if the recognized identifier is incorrect, each one of the substitute identifiers being generated in accordance with a character arrangement that corresponds to a character arrangement of at least one of the input identifier and the recognized identifier;
   d) determining which, if any, substitute identifiers match at least one member of a set of reference identifiers; and
   e) selecting one of the matched reference identifiers as corresponding to the input identifier.

2. The method according to claim 1, wherein each one of the input identifier, the recognized identifier, and the substitute identifiers include at least one numeral.

3. The method according to claim 1, wherein each one of the input identifier, the recognized identifier, and the substitute identifiers include at least one alphabetical character.

4. The method according to claim 1, wherein each one of the input identifier, the recognized identifier, and the substitute identifiers include at least one numeral and at least one alphabetical character.

5. The method according to claim 1, wherein each one of the input identifier, the recognized identifier, and the substitute identifiers include at least one check-sum character and a set of non-check-sum characters, and wherein the step b) comprises:

i) determining whether the check-sum character and the non-check-sum characters of the recognized identifier correspond to a predetermined relationship;
   ii) flagging the recognized identifier as incorrect if the check-sum character and the non-check-sum characters of the recognized identifier do not correspond to the predetermined relationship; and
   iii) flagging the recognized identifier as correct if the check-sum character and the non-check-sum characters correspond to the predetermined relationship.

6. The method according to claim 5, wherein the check-sum character of each one of the input identifier, the recognized identifier, and the substitute identifiers comprises a check-sum digit, wherein the non-check-sum characters of each one of the input identifier, the recognized identifier, and the substitute identifiers comprise non-check-sum digits, and wherein the predetermined relationship comprises the check-sum digit of a particular identifier equaling a modulo-N sum of the non-check-sum digits of the same particular identifier, N comprising an integer greater than zero.

7. The method according to claim 6, wherein the step c) comprises:

iv) calculating a difference between the check-sum digit of the recognized identifier and the modulo-N sum of the non-check-sum digits of the recognized identifier; and
   v) generating a plurality of new identifiers, each of the new identifiers having a check-sum digit and a set of non-check-sum digits, wherein the modulo-N sum of the non-check-sum digits of each new identifier equals its associated check-sum digit and wherein the modulo-N sum of the non-check-sum digits of each new identifier differs from the modulo-N sum of the non-check-sum digits of the recognized identifier by the difference calculated in step iv), the set of new identifiers corresponding to the set of substitute identifiers.

8. The method according to claim 1, wherein, if more than one of the set of substitute identifiers has a match within the set of reference identifiers, the step e) comprises prompting a user with each one of the matched reference identifiers until the user confirms that one of the matched reference identifiers corresponds to the input identifier.

9. A method of recognizing at least one input identifier, comprising:
   a) providing a recognized identifier based on the input identifier;
   b) determining whether the recognized identifier was recognized correctly by determining whether an information content of the recognized identifier corresponds to an information content of the input identifier;
   c) generating a set of substitute identifiers only if the recognized identifier is incorrect, each one of the substitute identifiers being generated in accordance with a character arrangement that corresponds to a character arrangement of at least one of the input identifier and the recognized identifier;
   d) reducing the set of substitute identifiers by eliminating a number of the substitute identifiers from the set of substitute identifiers;
   e) determining which, if any, substitute identifiers match at least one member of a set of reference identifiers; and
   f) selecting one of the matched reference identifiers as corresponding to the input identifier.

10. The method according to claim 9, wherein each one of the input identifier, the recognized identifier, and the substitute identifiers include at least one numeral.

11. The method according to claim 9, wherein each one of the input identifier, the recognized identifier, and the substitute identifiers include at least one alphabetical character.

12. The method according to claim 9, wherein each one of the input identifier, the recognized identifier, and the substitute identifiers include at least one numeral and at least one alphabetical character.

13. The method according to claim 9, wherein each one of the input identifier, the recognized identifier, and the substitute identifiers include at least one check-sum character and a set of non-check-sum characters, and wherein the step b) comprises:
   i) determining whether the check-sum character and the non-check-sum characters of the recognized identifier correspond to a predetermined relationship;
   ii) flagging the recognized identifier as incorrect if the check-sum character and the non-check-sum characters of the recognized identifier do not correspond to the predetermined relationship; and
   iii) flagging the recognized identifier as correct if the check-sum character and the non-check-sum characters correspond to the predetermined relationship.

14. The method according to claim 13, wherein the check-sum character of each one of the input identifier, the recognized identifier, and the substitute identifiers comprises a check-sum digit, wherein the non-check-sum characters of each one of the input identifier, the recognized identifier, and the substitute identifiers comprise non-check-sum digits, and wherein the predetermined relationship comprises the check-sum digit of a particular identifier equaling a modulo-N sum of the non-check-sum digits of the same particular identifier, N comprising an integer greater than zero.

15. The method according to claim 14, wherein the step c) comprises:
   iv) calculating a difference between the check-sum digit of the recognized identifier and the modulo-N sum of the non-check-sum digits of the recognized identifier; and
   v) generating a plurality of new identifiers, each of the new identifiers having a check-sum digit and a set of non-check-sum digits, wherein the modulo-N sum of the non-check-sum digits of each new identifier equals its associated check-sum digit and wherein the modulo-N sum of the non-check-sum digits of each new identifier differs from the modulo-N sum of the non-check-sum digits of the recognized identifier by the difference calculated in step iv), the set of new identifiers corresponding to the set of substitute identifiers.

16. The method according to claim 9, wherein the step d) comprises:
   i) determining, for each substitute identifier, a recognition probability of a user having provided that substitute identifier, given the recognized identifier; and
   ii) eliminating the substitute identifier from the set of substitute identifiers if the recognition probability associated with the substitute identifier is no more than a predetermined threshold.

17. The method according to claim 16, wherein a recognition probability associated with a given substitute identifier is obtained from a confusion matrix.

18. The method according to claim 9, wherein, if more than one of the reduced set of substitute identifiers has a match within the set of reference identifiers, the step f) comprises prompting a user with each one of the matched reference identifiers until the user confirms that one of the matched reference identifiers corresponds to the input identifier.

19. An apparatus for recognizing at least one input identifier, comprising:
   a) first means for providing a recognized identifier based on the input identifier;
   b) first means for determining whether the recognized identifier was recognized correctly by determining whether an information content of the recognized identifier corresponds to an information content of the input identifier;
   c) means for generating a set of substitute identifiers only if the recognized identifier is incorrect, each one of the substitute identifiers being generated in accordance with a character arrangement that corresponds to a character arrangement of at least one of the input identifier and the recognized identifier;
   d) second means for determining which, if any, substitute identifiers match at least one member of a set of reference identifiers; and
   e) means for selecting one of the matched reference identifiers as corresponding to the input identifier.

20. The apparatus according to claim 19, wherein each one of the input identifier, the recognized identifier, and the substitute identifiers include at least one numeral.

21. The apparatus according to claim 19, wherein each one of the input identifier, the recognized identifier, and the substitute identifiers include at least one alphabetical character.

22. The apparatus according to claim 19, wherein each one of the input identifier, the recognized identifier, and the substitute identifiers include at least one numeral and at least one alphabetical character.

23. The apparatus according to claim 19, wherein each one of the input identifier, the recognized identifier, and the substitute identifiers include at least one check-sum character and a set of non-check-sum characters, and wherein the first means for determining comprises:
   i) third means for determining whether the check-sum character and the non-check-sum characters of the recognized identifier correspond to a predetermined relationship;
   ii) means for flagging the recognized identifier as incorrect if the check-sum character and the non-check-sum characters of the recognized identifier do not correspond to the predetermined relationship; and
   iii) means for flagging the recognized identifier as correct if the check-sum character and the non-check-sum characters correspond to the predetermined relationship.

24. The apparatus according to claim 23, wherein the check-sum character of each one of the input identifier, the recognized identifier, and the substitute identifiers comprises a check-sum digit, wherein the non-check-sum characters of each one of the input identifier, the recognized identifier, and the substitute identifiers comprise non-check-sum digits, and wherein the predetermined relationship comprises the check-sum digit of a particular identifier equaling a modulo-N sum of the non-check-sum digits of the same particular identifier, N comprising an integer greater than zero.

25. The apparatus according to claim 24, wherein the means for generating comprises:

iv) means for calculating a difference between the check-sum digit of the recognized identifier and the modulo-N sum of the non-check-sum digits of the recognized identifier; and v) means for generating a plurality of new identifiers, each of the new identifiers having a check-sum digit and a set of non-check-sum digits, wherein the modulo-N sum of the non-check-sum digits of each new identifier equals its associated check-sum digit and wherein the modulo-N sum of the non-check-sum digits of each new identifier differs from the modulo-N sum of the non-check-sum digits of the recognized identifier by the difference calculated by the calculating means, the set of new identifiers corresponding to the set of substitute identifiers.

26. The apparatus according to claim 19, wherein the means for selecting comprises means for prompting a user with each one of the matched reference identifiers until the user confirms that one of the matched reference identifiers corresponds to the input identifier.

27. An apparatus for recognizing at least one input identifier, comprising:
  a) first means for providing a recognized identifier based on the input identifier;
  b) first means for determining whether the recognized identifier was recognized correctly by determining whether an information content of the recognized identifier corresponds to an information content of the input identifier;
  c) means for generating a set of substitute identifiers only if the recognized identifier is incorrect, each one of the substitute identifiers being generated in accordance with a character arrangement that corresponds to a character arrangement of at least one of the input identifier and the recognized identifier;
  d) means for reducing the set of substitute identifiers by eliminating a number of the substitute identifiers from the set of substitute identifiers;
  e) second means for determining which, if any, substitute identifiers match at least one member of a set of reference identifiers; and
  f) means for selecting one of the matched reference identifiers as corresponding to the input identifier.

28. The apparatus according to claim 27, wherein each one of the input identifier, the recognized identifier, and the substitute identifiers include at least one numeral.

29. The apparatus according to claim 27, wherein each one of the input identifier, the recognized identifier, and the substitute identifiers include at least one alphabetical character.

30. The apparatus according to claim 27, wherein each one of the input identifier, the recognized identifier, and the substitute identifiers include at least one numeral and at least one alphabetical character.

31. The apparatus according to claim 27, wherein each one of the input identifier, the recognized identifier, and the substitute identifiers include at least one check-sum character and a set of non-check-sum characters, and wherein the first means for determining comprises:
  i) third means for determining whether the check-sum character and the non-check-sum characters of the recognized identifier correspond to a predetermined relationship;
  ii) means for flagging the recognized identifier as incorrect if the check-sum character and the non-check-sum characters of the recognized identifier do not correspond to the predetermined relationship; and
  iii) means for flagging the recognized identifier as correct if the check-sum character and the non-check-sum characters correspond to the predetermined relationship.

32. The apparatus according to claim 31, wherein the check-sum character of each one of the input identifier, the recognized identifier, and the substitute identifiers comprises a check-sum digit, wherein the non-check-sum characters of each one of the input identifier, the recognized identifier, and the substitute identifiers comprise non-check-sum digits, and wherein the predetermined relationship comprises the check-sum digit of a particular identifier equaling a modulo-N sum of the non-check-sum digits of the same particular identifier, N comprising an integer greater than zero.

33. The apparatus according to claim 32, wherein the means for generating comprises:
  iv) means for calculating a difference between the check-sum digit of the recognized identifier and the modulo-N sum of the non-check-sum digits of the recognized identifier; and
  v) means for generating a plurality of new identifiers, each of the new identifiers having a check-sum digit and a set of non-check-sum digits, wherein the modulo-N sum of the non-check-sum digits of each new identifier equals its associated check-sum digit and wherein the modulo-N sum of the non-check-sum digits of each new identifier differs from the modulo-N sum of the non-check-sum digits of the recognized identifier by the difference calculated by the calculating means, the set of new identifiers corresponding to the set of substitute identifiers.

34. The apparatus according to claim 27, wherein the means for reducing comprises:
  i) third means for determining, for each substitute identifier, a recognition probability of a user having provided that substitute identifier, given the recognized identifier; and
  ii) means for eliminating the substitute identifier from the set of substitute identifiers if the recognition probability associated with the substitute identifier is no more than a predetermined threshold.

35. The apparatus according to claim 34, wherein a recognition probability associated with a given substitute identifier is obtained from a confusion matrix.

36. The apparatus according to claim 27, wherein the means for selecting comprises means for prompting a user with each one of the matched reference identifiers until the user confirms that one of the matched reference identifiers corresponds to the input identifier.

37. An apparatus for recognizing at least a first input identifier, comprising:
  a processing device;
  a recognizing device coupled to the processing device, the recognizing device including an input for receiving an input identifier;
  a reference identifier database coupled to the processing device;
  a check-sum correction module coupled to the processing device and for determining whether an information content of a recognized identifier corresponds to an information content of the input identifier; and
  a substitute identifier database coupled to the processing device and provided with at least one generated substitute identifier only if a recognized identifier generated based on the first input identifier is determined to be incorrect, the substitute identifier being generated in accordance with a character arrangement that corresponds to a character arrangement of at least one of the input identifier and the recognized identifier.

38. The apparatus according to claim 37, further comprising:
a data input device coupled to the processing device; and
a display device coupled to the processing device.

39. An apparatus for recognizing at least a first input identifier, comprising:
a processing device;
a recognizing device coupled to the processing device, the recognizing device including an input for receiving an input identifier;
a reference identifier database coupled to the processing device;
a check-sum correction module coupled to the processing device;
a substitute identifier database coupled to the processing device;
a confusion matrix memory coupled to the processing device; and
a substitute set pruning module coupled to the processing device.

40. The apparatus according to claim 39, further comprising:
a data input device coupled to the processing device; and
a display device coupled to the processing device.

41. The apparatus according to claim 39, wherein the recognizing device comprises a speech recognition device.

42. The apparatus according to claim 39, wherein the recognizing device comprises a touch-tone recognizing device.

43. The method according to claim 1, wherein:
the step b) comprises:
i) performing a first calculation on at least one value derived from the input identifier in order to produce a first result,
ii) performing a second calculation on at least one value derived from the recognized identifier in order to produce a second result, and
iii) determining that the recognized identifier is incorrect if the first result and the second result exhibit a predetermined relationship with respect to each other, and
the step c) comprises:
i) generating the set of substitute identifiers such that each substitute identifier exhibits the predetermined relationship with respect to the recognized identifier.

44. The method according to claim 9, wherein:
the step b) comprises:
i) performing a first calculation on at least one value derived from the input identifier in order to produce a first result,
ii) performing a second calculation on at least one value derived from the recognized identifier in order to produce a second result, and
iii) determining that the recognized identifier is incorrect if the first result and the second result exhibit a predetermined relationship with respect to each other, and
the step c) comprises:
i) generating the set of substitute identifiers such that each substitute identifier exhibits the predetermined relationship with respect to the recognized identifier.

45. The apparatus according to claim 19, wherein:
the first means for determining comprises:
means for performing a first calculation on at least one value derived from the input identifier in order to produce a first result,
means for performing a second calculation on at least one value derived from the recognized identifier in order to produce a second result, and
means for determining that the recognized identifier is incorrect if the first result and the second result exhibit a predetermined relationship with respect to each other, and
the second means for providing comprises:
means for generating the set of substitute identifiers such that each substitute identifier exhibits the predetermined relationship with respect to the recognized identifier.

46. The apparatus according to claim 27, wherein:
the first means for determining comprises:
means for performing a first calculation on at least one value derived from the input identifier in order to produce a first result,
means for performing a second calculation on at least one value derived from the recognized identifier in order to produce a second result, and
means for determining that the recognized identifier is incorrect if the first result and the second result exhibit a predetermined relationship with respect to each other, and
the second means for providing comprises:
means for generating the set of substitute identifiers such that each substitute identifier exhibits the predetermined relationship with respect to the recognized identifier.

47. A method of recognizing at least one input identifier, comprising:
a) performing an input identifier recognition operation in order to produce a non-intermediate set of information corresponding to a recognized identifier based on the input identifier;
b) after the performance of the input identifier recognition operation is completed, determining whether the recognized identifier was recognized correctly;
c) generating a set of substitute identifiers if the recognized identifier is incorrect;
d) determining which, if any, substitute identifiers match at least one member of a set of reference identifiers; and
e) selecting one of the matched reference identifiers as corresponding to the input identifier.

48. A method of recognizing at least one input identifier, comprising:
a) performing an input identifier recognition operation in order to produce a non-intermediate set of information corresponding to a recognized identifier based on the input identifier;
b) after the performance of the input identifier recognition operation is completed, determining whether the recognized identifier was recognized correctly;
c) generating a set of substitute identifiers if the recognized identifier is incorrect;
d) reducing the set of substitute identifiers by eliminating a number of the substitute identifiers from the set of substitute identifiers;
e) determining which, if any, substitute identifiers match at least one member of a set of reference identifiers; and f) selecting one of the matched reference identifiers as corresponding to the input identifier.

49. A system for recognizing at least one input identifier, comprising:
- a) an arrangement for performing an input identifier recognition operation in order to produce a non-intermediate set of information corresponding to a recognized identifier based on the input identifier;
- b) an arrangement for determining, after the performance of the input identifier recognition operation is completed, whether the recognized identifier was recognized correctly;
- c) an arrangement for generating a set of substitute identifiers if the recognized identifier is incorrect;
- d) an arrangement for determining which, if any, substitute identifiers match at least one member of a set of reference identifiers; and
- e) an arrangement for selecting one of the matched reference identifiers as corresponding to the input identifier.

50. A system for recognizing at least one input identifier, comprising:
- a) an arrangement for performing an input identifier recognition operation in order to produce a non-intermediate set of information corresponding to a recognized identifier based on the input identifier;
- b) an arrangement for determining, after the performance of the input identifier recognition operation is completed, whether the recognized identifier was recognized correctly;
- c) an arrangement for generating a set of substitute identifiers if the recognized identifier is incorrect;
- d) an arrangement for reducing the set of substitute identifiers by eliminating a number of the substitute identifiers from the set of substitute identifiers;
- e) an arrangement for determining which, if any, substitute identifiers match at least one member of a set of reference identifiers; and
- f) an arrangement for selecting one of the matched reference identifiers as corresponding to the input identifier.

\* \* \* \* \*